US009551317B2

(12) United States Patent
Dahl (10) Patent No.: US 9,551,317 B2
(45) Date of Patent: Jan. 24, 2017

(54) WIND TURBINE BLADE WITH ELONGATED FASTENING MEMBERS IN THE ROOT REGION THEREOF

(75) Inventor: Martin Dahl, Flensburg (DE)

(73) Assignee: LM WP PATENTS HOLDING A/S, Kolding (DK)

( * ) Notice: Subject to any disclaimer, the term of this patent is extended or adjusted under 35 U.S.C. 154(b) by 432 days.

(21) Appl. No.: 14/110,897

(22) PCT Filed: Apr. 11, 2012

(86) PCT No.: PCT/EP2012/056523
§ 371 (c)(1),
(2), (4) Date: Oct. 9, 2013

(87) PCT Pub. No.: WO2012/140043
PCT Pub. Date: Oct. 18, 2012

(65) Prior Publication Data
US 2014/0030095 A1 Jan. 30, 2014

(30) Foreign Application Priority Data
Apr. 11, 2011 (EP) .................................. 11161909

(51) Int. Cl.
*F03D 1/06* (2006.01)
*B21K 3/04* (2006.01)
(Continued)

(52) U.S. Cl.
CPC .............. *F03D 1/0658* (2013.01); *B21K 3/04* (2013.01); *B21D 53/78* (2013.01); *F03D 1/001* (2013.01);
(Continued)

(58) Field of Classification Search
CPC ...... F03D 1/0658; F03D 1/001; F03D 1/0691; Y10T 29/49336; Y10T 29/49337; Y10T 29/49339; Y10T 29/49963; B21D 53/78; B23D 15/002; B23D 15/02; B23D 15/04; B21K 3/04
(Continued)

(56) References Cited

U.S. PATENT DOCUMENTS 4,412,784 A * 11/1983 Wackerle .............. B64C 27/473
416/229 R
2005/0123374 A1* 6/2005 Thorning .............. B29C 70/525
411/82.3
(Continued)

FOREIGN PATENT DOCUMENTS

EP 0 057 272 A2 8/1982
EP 1 398 499 A1 3/2004
(Continued)

*Primary Examiner* — Christopher Verdier
(74) *Attorney, Agent, or Firm* — Nath, Goldberg & Meyer; Jerald L. Meyer; Tanya E. Harkins (57) ABSTRACT

A wind turbine blade for a wind turbine is a shell structure of a fiber-reinforced composite and comprises a root region and an airfoil region. The root region has a ring-shaped cross section and comprises a plurality of elongated bushings 7 with an inner thread 22 and embedded interspaced in the fiber-reinforced polymer so as to substantially follow the circumference of the root region and allow access from the outside to the inner threads. Each fastening member 7 is provided with a notch 60' in the periphery 11 thereof. A rod-shaped locking element 61 passes through the notch 60' in engagement therewith. The locking element 61 is fixedly and tightly fitting arranged in a through-going circular bore 65 extending through the wall of the root region.

15 Claims, 5 Drawing Sheets (51) Int. Cl.
*B21D 53/78* (2006.01)
*F03D 1/00* (2006.01)
(52) U.S. Cl.
CPC .. *F05B 2260/301* (2013.01); *F05B 2280/6003* (2013.01); *Y02E 10/721* (2013.01); *Y10T 29/49336* (2015.01); *Y10T 29/49337* (2015.01); *Y10T 29/49963* (2015.01)
(58) Field of Classification Search
USPC ..... 416/204 R, 204 A, 205, 207–209, 214 R, 416/214 A, 219 A, 220 A, 229 R, 229 A, 416/230, 226, 241 A
See application file for complete search history.

(56) References Cited

U.S. PATENT DOCUMENTS

2007/0231146 A1* 10/2007 Birkemeyer .......... F03D 1/0658
  416/204 R
2009/0232656 A1* 9/2009 Grabau ................ F03D 1/0641
  416/223 R

FOREIGN PATENT DOCUMENTS

| EP | 1 956 235 A1 | 8/2008 |
|---|---|---|
| WO | 03/057457 A1 | 7/2003 |
| WO | 2010/018225 A2 | 2/2010 |

* cited by examiner

WIND TURBINE BLADE WITH ELONGATED FASTENING MEMBERS IN THE ROOT REGION THEREOF

This is a National Phase Application filed under 35 U.S.C. §371 as a national stage of International Application No. PCT/EP2012/056523, filed Apr. 11, 2012, claiming the benefit from European Patent Application No. 11161909.4, filed Apr. 11, 2011, the entire content of each of which is hereby incorporated by reference in its entirety.

TECHNICAL FIELD

A wind turbine blade for a wind turbine rotor comprising a hub from which the wind turbine blade extends when mounted to the hub, the wind turbine blade including a shell structure of a fibre-reinforced composite material comprising fibres embedded in a polymer matrix, the wind turbine blade extending in longitudinal direction and having a profiled contour including a pressure side and a suction side as well as a leading edge and a trailing edge, said edges defining a chord plane therebetween, when seen in the longitudinal direction the profiled contour comprising a root region with a root end face, an airfoil region and optionally a transition region between the root region and the airfoil region,
the root region having a ring-shaped cross section with an outer surface and an inner surface, the root region comprising a plurality of elongated fastening members provided with fastening means and embedded mutually spaced apart in the fibre-reinforced polymer so as to substantially follow a circumference of the root region and allow access from the outside to the fastening means used for mounting the blade to the hub, the fastening members comprising an outer surface, a first end arranged at the root end face and a second end opposite the first end thereof.

BACKGROUND ART

Wind turbine blades and thereby also the root region thereof are often made by assembling two blade halves essentially corresponding to the suction side and the pressure side, respectively, along the chord plane. However, the blades may also be moulded in their entirety by so-called hollow moulding.

The root region comprises layers of fibres forming an outer layer and an inner layer between which fastening members in the form of bushings are placed. A separately formed retaining means in form of an insert is placed between each pair of adjacent bushings, whereby the bushings are mutually separated by the inserts. The known inserts are made of glass fibres embedded in a suitable resin.

A potential problem in connection with wind turbine blades is load transfer from the fibre composite structure of the root region to the hub of the wind turbine. The connection and transfer of loads from the blade to the hub is inter alia provided by mounting the blade to the hub by screwing bolts into the bushings placed in the root or by means of nuts screwed onto stud bolts screwed into the bushings. In case the number of bolts and thereby the number of bushings has to be increased to handle a given load, remaining area of the fibre composite material between the bushings is reduced. This may result in the root connection being insufficiently supported to withstand the loads, whereby the connection between the blade root and the hub may fail since the bushings are insufficiently retained in the composite material and thus pulled out of the composite material of the root region. This is especially a problem when long and thereby heavy blades are to be used.

WO 2010/018225 provides a method of manufacturing a wind turbine blade comprising a steel wire or steel fibre-reinforced polymer matrix. However, the document does not address the problem of how the root region is to be designed to withstand extreme loads in the connection between the blade root and the hub.

DISCLOSURE OF THE INVENTION

It is an object of the invention to provide a wind turbine blade with a root region overcoming at least one of the drawbacks of the prior art or at least provides a useful alternative.

According to a first aspect of the invention, a wind turbine blade of the type described is provided with a root region in which at least a number, and preferably all, of the elongated fastening members are provided with at least one notch in the periphery thereof, said notch having a notch wall, a first notch end and an opposite second notch end, and that a rod-shaped locking element passes through said notch so as to at least substantially engage at least a portion of the notch wall and so that a first portion of the rod-shaped locking element extends beyond the first notch end and a second portion of the rod-shaped locking element extends beyond the second notch end, the rod-shaped locking element being fixedly arranged and preferably tightly fitting in a circular bore having an axis and extending at least partly through the shell structure of the root region from the inner or outer surface thereof.

Hereby, the retention of the elongated fastening members is improved compared to known methods, as the first and second portion of the rod-shaped locking element is securely embedded in the polymer matrix of fibre-reinforced composite material and thereby retains the elongated fastening member due to its engagement with the notch in the periphery of the elongated fastening member.

By the phrase "at least substantially engages at least a portion of the notch wall" is to be understood that the rod-shaped locking element may directly engage the notch surface, but a thin layer of the polymer matrix and/or fibres may also be present between the notch surface and the surface of the rod-shaped locking element so that no direct contact therebetween exist. However, regardless of whether a direct contact or engagement exists, the rod-shaped locking element provides an improved retention of the elongated fastening member, as the force which tends to pull out the fastening member is distributed over a large surface area.

Due to the improved retention of the fastening members it is possible to attach longer and thereby heavier blades to the hub without increasing the diameter of the root region and/or the numbers of fastening members.

According to an embodiment of the invention the notch wall may be partly cylindrical with a cylinder axis being coaxial with the axis of the bore.

Hereby, the area of the engagement between the notch and the rod-shaped locking elements is increased and the retention of the fastening members thereby is improved.

According to a further embodiment of the invention the rod-shaped locking element may have a circular cross section corresponding at least substantially to that of the bore.

Thereby, the engagement or contact area between the notch surface and the rod-shaped locking element is further increased and the retention of the fastening members is further improved.

According to an additional embodiment of the invention the bore may be a through-going bore.

In an additional embodiment the axis of the bore may extend substantially in radial direction relative to the root region.

At present this embodiment is considered the most preferred embodiment with respect to the manufacture thereof.

Advantageously, the rod-shaped locking element extends substantially over the entire extent of the bore.

As a result, the surface area of the rod-shaped locking element being in contact with the fibre-reinforced composite material is optimized and the optimum retention of the fastening members is obtained thereby.

According to a further embodiment of the invention the notch is placed at distance from the first end of the elongated fastening members, said distance being 50-95% or 60-95% or 70-95% of the length of the elongated fastening members.

According to yet another embodiment the fastening members are provided with two notches, a first notch and a second notch, said notches being arranged substantially opposite each other, preferably diametrically opposite each other.

The provision of more than one notch improves the retention of the fastening members.

According to an additional embodiment the notches of adjacent fastening members are arranged so as to face each other and the bore and the rod-shaped locking element are provided in such a way between the adjacent fastening members that the rod-shaped locking element engages the notch wall of both notches.

This embodiment facilitates the manufacture thereof, as each rod-shaped locking element engages a notch wall in two fastening members.

Further, the notches of all of the fastening members may be arranged at the same distance from the first end of the elongated fastening members.

However, the notches may also be arranged in two or more interspaced areas so as to be arranged at different distances from the first end of the elongated fastening members.

According to a further embodiment the fastening members are bushings preferably having a substantially uniform cross section in the longitudinal direction thereof, and the fastening means is a thread in a bore of the bushing.

However, the fastening members may also be rods preferably having a substantially uniform cross section in the longitudinal direction thereof and the fastening means may be an outer thread of the rod.

According to another embodiment the at least one notch is provided so as to intersect the bore of the bushing.

According to a further embodiment the fastening members and the rod-shaped locking elements may be made of metal, preferably steel.

Thereby, the strength thereof is optimised.

According to an additional embodiment metal fibres, preferably steel fibres, are firmly fixed to the fastening members so as to extend therefrom and may be embedded in the polymer matrix of the fibre-reinforced composite material of the root region.

The metal fibres embedded in the polymer matrix and being firmly fixed to the fastening members provide an improved retention of the fastening members.

The fibre-reinforced composite material may comprise metal fibres, preferably steel fibres.

20, 30, 40, 50, 60, 70, 80, 90 or 100% by volume of fibres may be metal fibres, the remaining fibres being a different type of fibres than metal fibres, preferably glass and/or carbon fibres.

The polymer matrix of fibre-reinforced composite material is preferably polyester, epoxy or vinylester. However, any suitable polymer matrix may be used.

The outer surface of the fastening members may be corrugated so as to improve the retention of the fastening members in the fibre-reinforced composite material.

The present invention further relates to a method for producing a wind turbine blade according to the invention, wherein the elongated fastening members are provided with at least one notch before being embedded in the fibre-reinforced composite material of the root region, and wherein the bore is drilled through the composite material of the root region from the inner or outer surface thereof such that it passes through the notch and at least substantially reveals the notch surface and subsequently thereto the rod-shaped locking element is fixedly arranged in the bore, preferably tightly fitting herein.

By providing the fastening members with a notch before being embedded in the fibre-reinforced composite material, the bore is substantially only drilled in the fibre-reinforced composite material which is considered advantageous for providing an exact bore.

Finally, the present invention relates to a method for producing a wind turbine blade according to the invention, wherein the elongated fastening members are embedded in the fibre-reinforced composite material of the root region and wherein the bore is drilled through the composite material of the root region from the inner or outer surface thereof such that it intersects the periphery of the elongated fastening member and thereby provides the notch surface, and subsequently thereto the rod-shaped locking element is fixedly arranged in the bore, preferably tightly fitting therein.

Thereby, the need for providing a notch in the elongated fastening members are eliminated, as the bore is provided both in the fibre-reinforced composite material and in the material of the elongated fastening member so as to provide the notch in the latter.

BRIEF DESCRIPTION OF THE DRAWINGS

The invention is explained in greater detail below with reference to the drawings, in which.

DETAILED DESCRIPTION OF THE INVENTION

Figure 1:
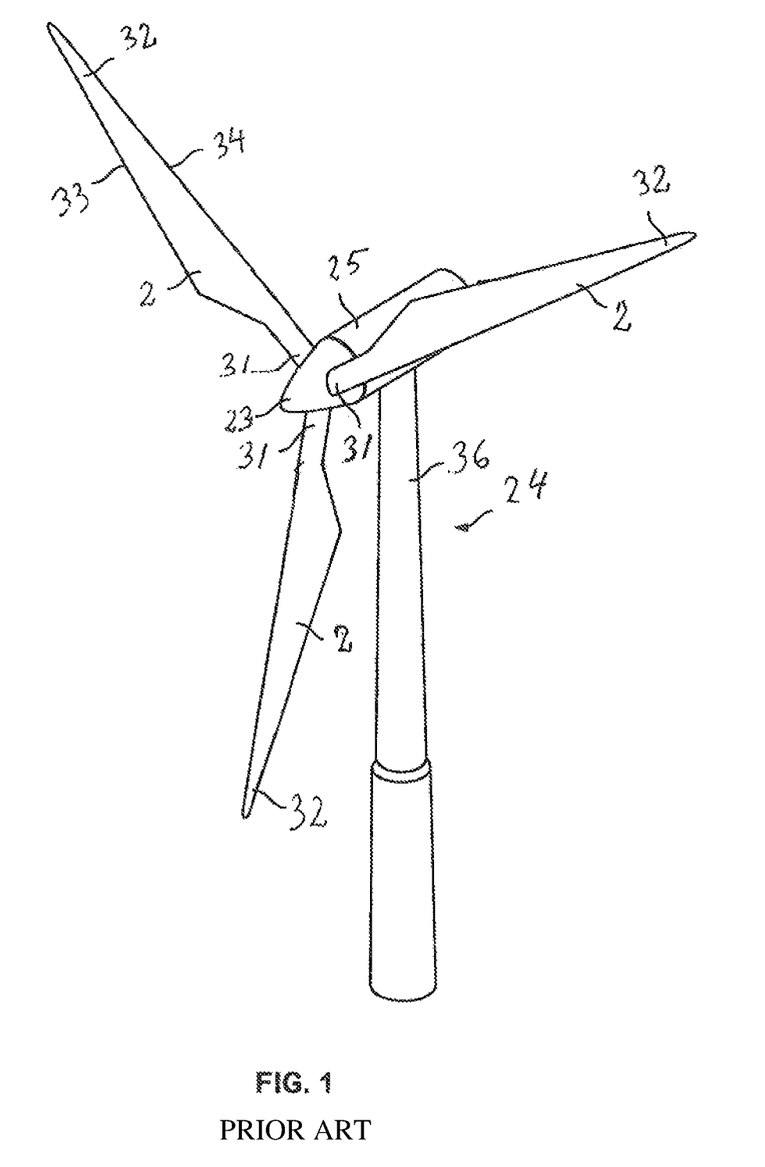
FIG. 1 shows a wind turbine.

FIG. 1 illustrates a conventional, modern upwind turbine 24 according to the so-called "Danish concept" with a tower 36, a nacelle 25 and a rotor with a substantially horizontal rotor shaft. The rotor includes a hub 23 and three blades 2 extending radially from the hub 23, each having a blade root 31 nearest the hub, and a blade tip 32 furthest from the hub 23.

Figure 2:
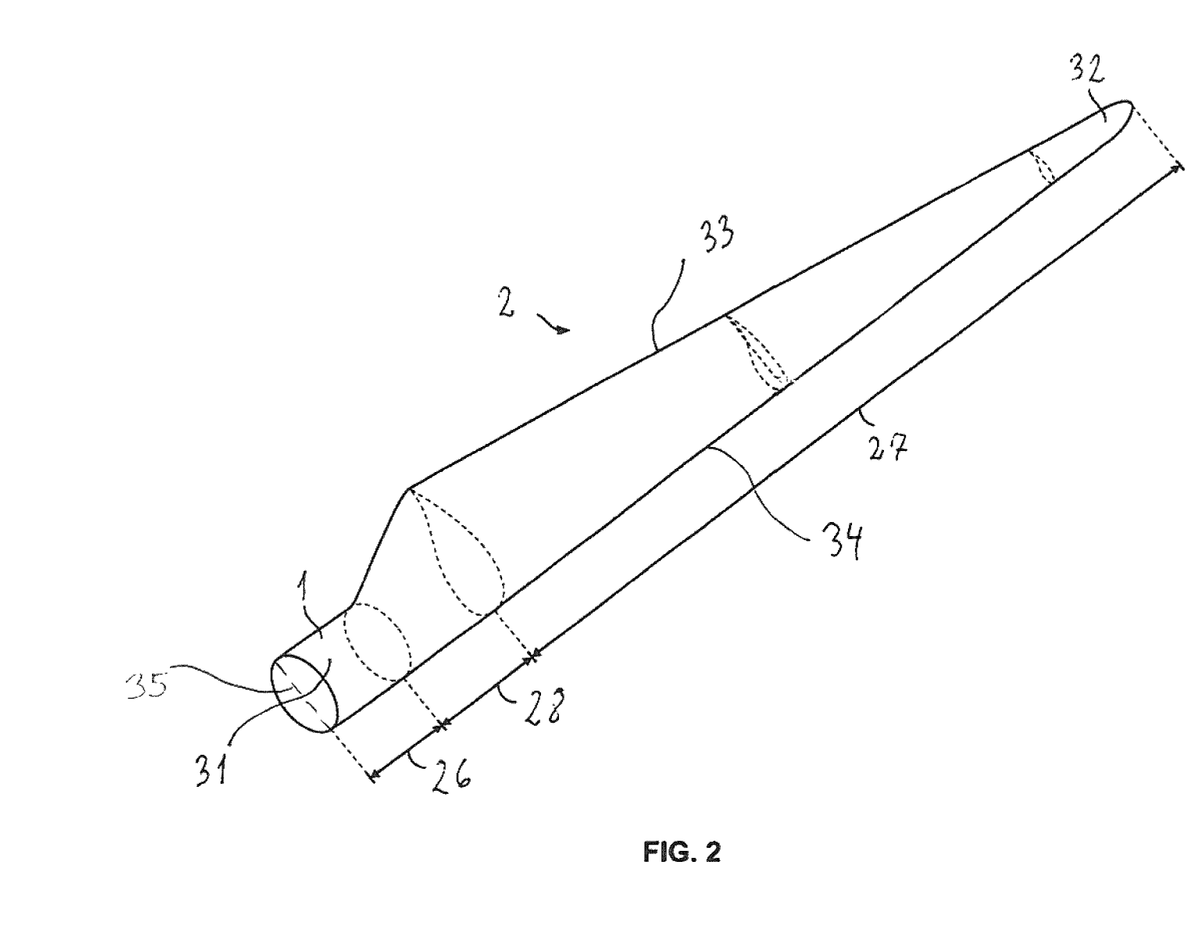
FIG. 2 is a diagrammatic perspective view of a wind turbine blade according to the invention.

As evident seen from FIG. 2, the blade 2 comprises a root region 26 with a root end face 29 closest to the hub, an airfoil region 27 furthest away from the hub, and a transition area 28 between the root region 26 and the airfoil region 27. The airfoil region 27 has an ideal or almost ideal blade shape, whereas the root region 26 has a substantially circular cross section, which reduces storm loads and makes it easier and safer to mount the blade 2 to the hub 23. Preferably, the diameter of the blade root 31 is constant along the entire root region 26. The transition region 28 has a shape gradually changing from the circular shape of the root region 26 to the airfoil profile of an airfoil region 27. The width of the transition region 28 increases substantially linearly with increasing distance from the hub 23.

The blade is often made of two blades halves assembled by being glued or bolted together substantially along a chord plane 35 of the blade. The blade 2 comprises a leading edge 34 facing the rotational direction of the blade 2 when the blade 2 is mounted on the hub 23 and a trailing edge 33 facing in the opposite direction of the leading edge 34. The chord plane 35 extends between the leading edge 34 and the trailing edge 33 of the blade 2. It should be noted that the chord plane does not necessarily run straight over its entire extent, since the blade may be twisted and/or curved, thus providing a chord plane with a correspondingly twisted and/or curved course, this being most often the case in order to compensate for the local velocity of the blade being dependent on the radius from the hub. Due to the circular cross section, the root region 26 does not contribute to the production of the wind turbine and, in fact, it lowers the production slightly due to the wind resistance.

Figure 3:
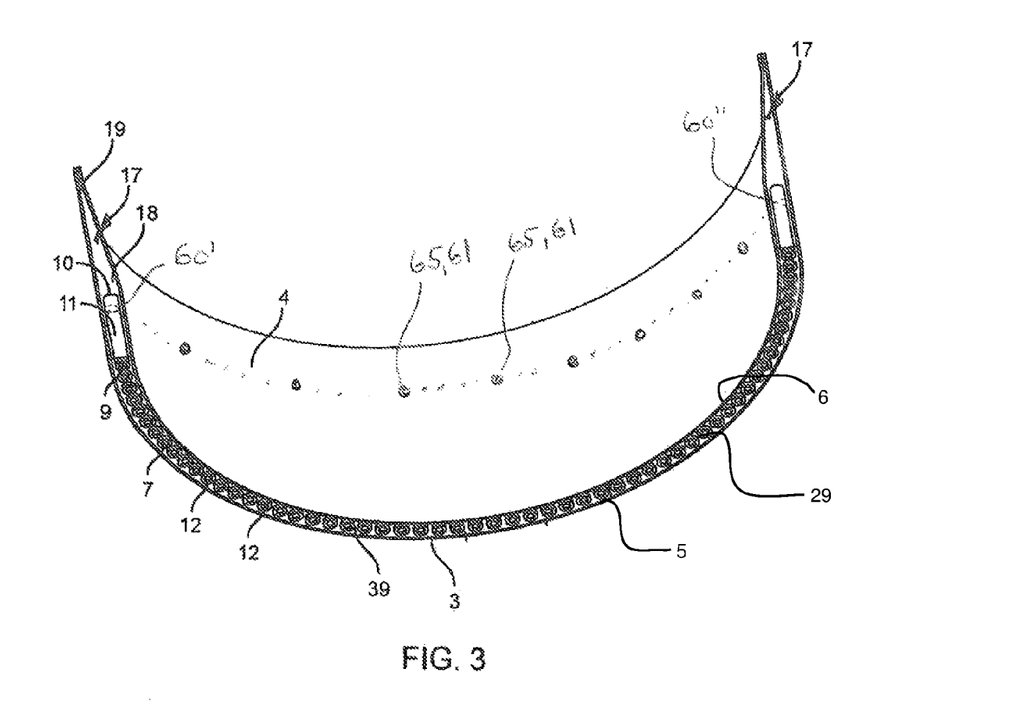
FIG. 3 is a perspective, longitudinal, sectional view of a portion of a root region of an embodiment of a wind turbine blade according to the invention.
Figure 4:
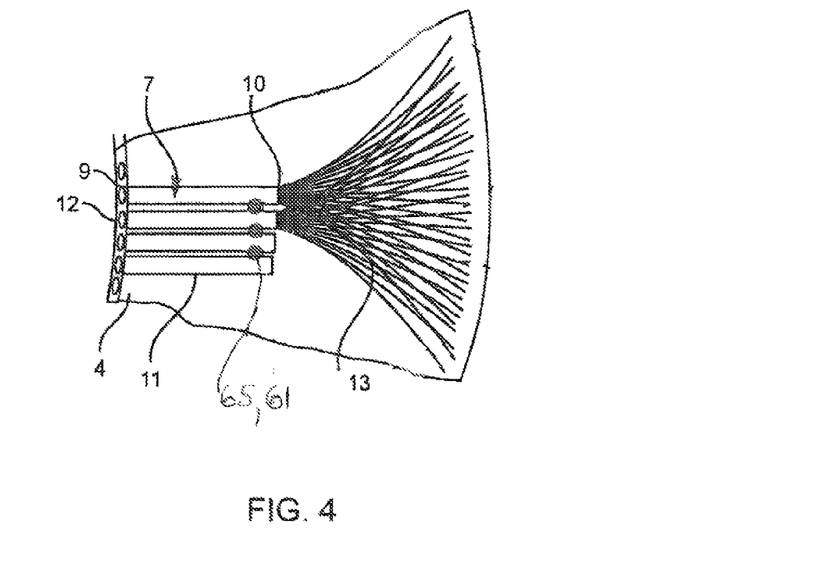
FIG. 4 shows a portion of the root region shown in FIG. 3.

As seen in FIGS. 3 and 4, the blade including the root region 26 is formed as a shell structure. The shell structure of the root region 26 is ring-shaped and comprises an outer surface 3 formed by an outer layer 5 of a fibre-reinforced polymer matrix advantageously of glass fibres and/or carbon fibres and a resin, such as epoxy, polyester or vinylester, and an oppositely arranged inner surface 4 formed by an inner layer 6 being made of the same material as the outer layer 5. Elongated fastening members 7 with fastening means 22 are placed between the layers 5, 6. Advantageously, the elongated fastening members 7 are bushings having a circular cross section and comprise a central bore 12 with an inner thread 22 as fastening means. The bushing 7 comprises an outer periphery 11, a first end 9 and an oppositely arranged second end 10. The first end 9 of the bushing 7 is placed at the root end face 29 of the root region. The bushings 7 are arranged mutually spaced apart so as to substantially follow the circumference of the root region and allow access from the outside to the fastening means 22, i.e. the threads used for mounting the blade to the hub. Further and as shown in FIG. 4, metal fibres 13, such as steel fibres, may be firmly fixed to the bushings 7, especially to the second end 10 thereof, so as to provide an increased retention of the bushings 7 in the fibre-reinforced composite material of the root region.

Intermediate retaining means comprising metal fibres 13 is arranged in each region between adjacent interspaced lateral surface portion of the fastening members 7, i.e. in the present example the bushings. Further, in the present embodiment the intermediate retaining means are formed of separately manufactured inserts 39. As it appears from FIG. 5, the inserts 39 comprise a first insert part 40 and a second insert part 41. The first insert part 40 essentially corresponds to the region between the lateral surface portions of adjacent bushings 7 and is provided with opposite lateral faces 42, 43 formed complimentary to the lateral surface portions of the adjacent bushings 7. The inserts 39 substantially extend up next to the adjacent bushings when seen in circumferential direction. Further, the first insert part 40 extends from the first end of the bushings 7 and beyond the second end thereof, as clearly seen in FIG. 5. The second insert part 41 is a wedge-shaped tapering extension of the first insert part 40. As seen in radial direction of the root region, the first insert part 40 has an extent substantially corresponding to that of the bushings.

Figure 5:
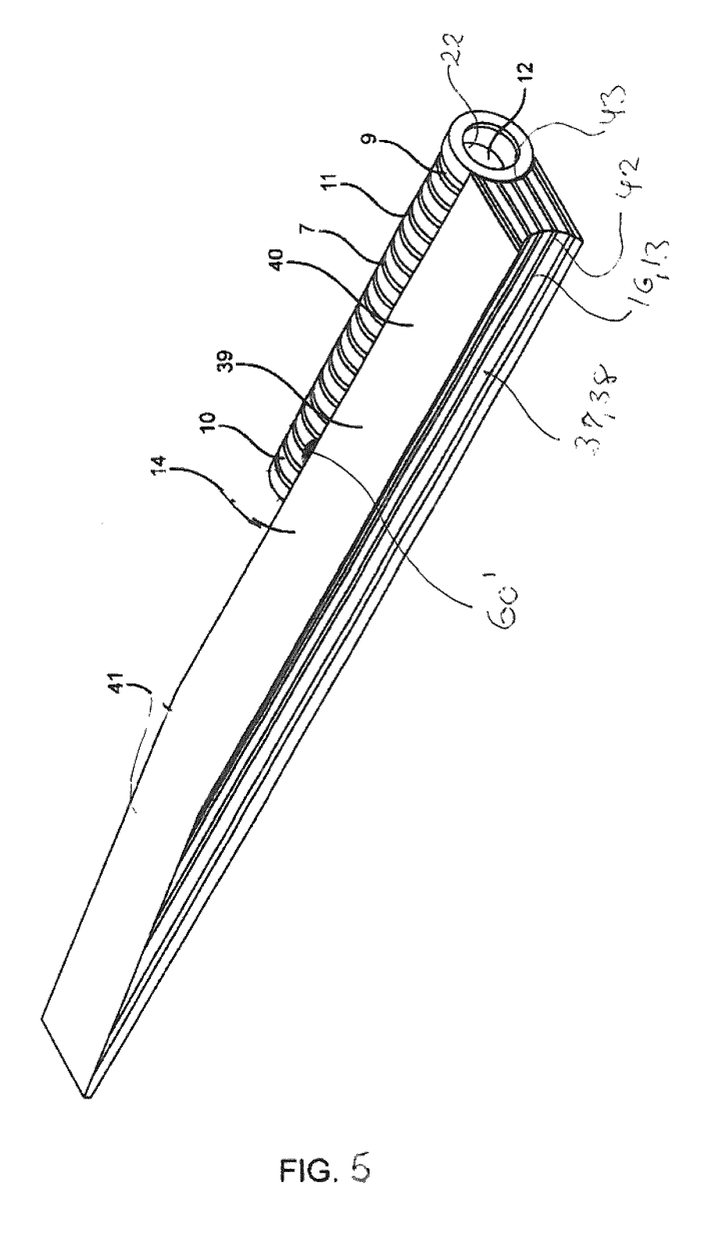
FIG. 5 is a perspective view of a separate pre-formed insert arranged next to an elongated fastening member in form of a bushing.

The pre-formed insert 39 comprises a number of first layers 16 comprising metal fibres 13 and intermediate second layers 37 comprising a second fibre material 38 differing from the metal fibres, as shown in FIG. 5.

As seen in FIG. 3 a wedge-shaped element 17 is arranged behind each bushing 7 when seen in longitudinal direction of the blade. A first end 18 of the element 17 is arranged in abutment with the second end of the bushing 7, and a second end 19 of the element 17 is tapered. The wedge-shaped elements 17 are made of balsawood or a hard polymer foam or a similar material. In a longitudinal sectional view, the bushing 7 and the abutting wedge-shaped element 17 have a shape corresponding to the shape of the inserts 39 so that the wall thickness of the root region decreases gradually in the longitudinal direction of the blade.

As seen especially in FIG. 3, through-going bores 65 are drilled through the wall of the root region from the inner surface 4 to the outer surface 3 thereof. The bores 65 are arranged in line with a notch 60', 60" provided in the outer periphery 11 of the bushings 7.

Figure 6:
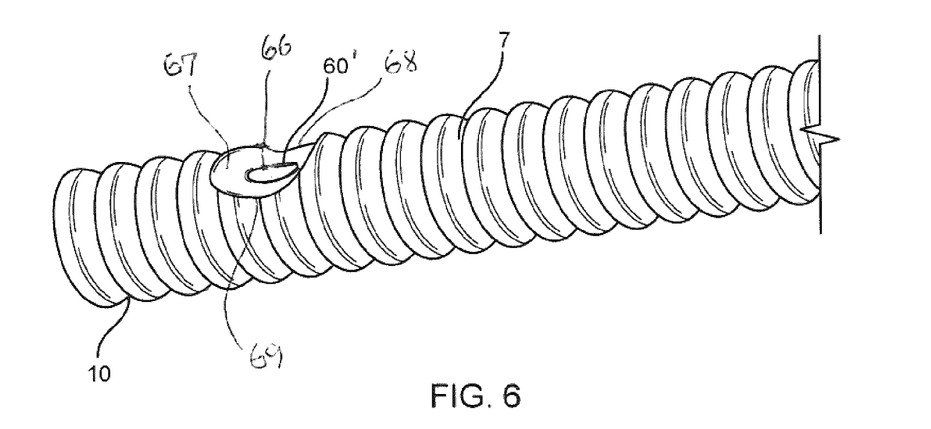
FIG. 6 shows an embodiment of an elongated fastening member in form of a bushing including two notches.
Figure 7:
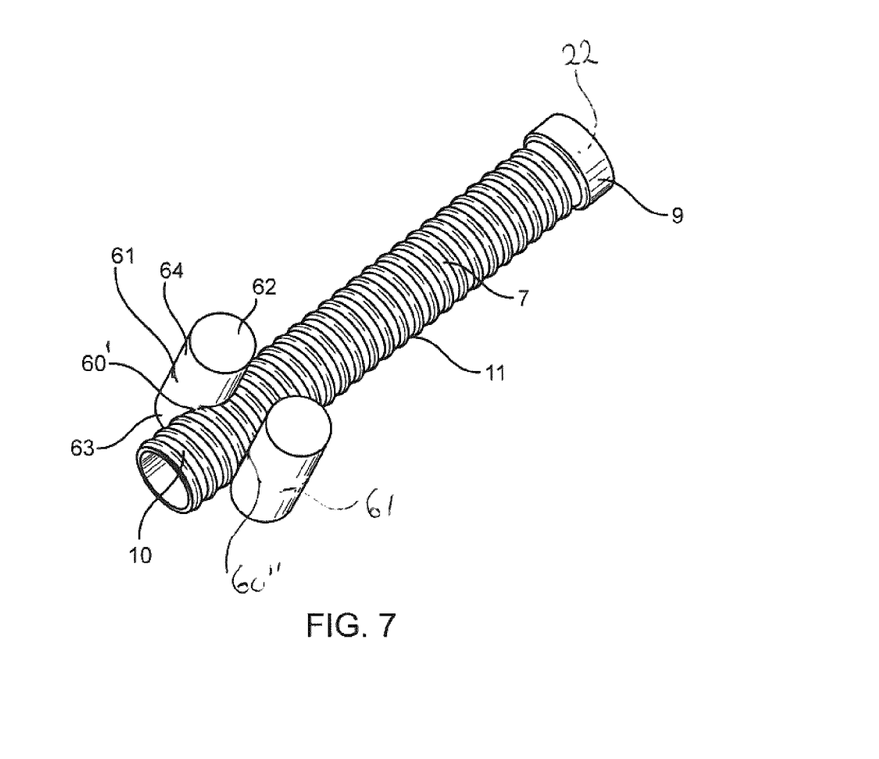
FIG. 7 shows the bushing shown in FIG. 6, a rod-shaped locking element engaging each of the notches.

As shown in FIGS. 6-7, a first notch 60' may be arranged diametrically opposite a second notch 60". Each notch has a part-cylindrical notch surface 67 having a first end 68 and a second end 69. Further, as it appears from FIGS. 6 and 7, the notches 60', 60" are arranged adjacent the second end of the bushings 7. As shown the bushings 7 may have a corrugated outer surface.

A rod-shaped locking element 61 is fixedly arranged and tightly fitting in the bore 65. A central portion of the surface of the rod-shaped locking element 61 engages the notch surface 67 of the notch 60', 60" so that a first end 62 of the rod-shaped locking element 61 extends beyond the first end 68 of the notch and a second end 63 of the rod-shaped locking element 61 extends beyond a second 69 of the notch, as seen in FIG. 7.

The rod-shaped locking elements 61 have a cylindrical shape and extend coaxially with the bores 65 in which they are received and such that the end faces thereof are substantially flush with the inner surface 4 and the outer surface 3, respectively, of the root region 26.

During manufacture of the blade the bushings 7 are placed in a mould and embedded in the polymer matrix of the fibre-reinforced composite material. The fibre material may comprise any type of fibres, such as glass fibres, carbon fibres and metal fibres. The polymer matrix may comprise a resin, such as polyester, epoxy or vinylester.

The circular bores 65 are drilled through the fibre-reinforced composite material. By this drilling process the notches 60', 60" may be formed in the bushings 7. Alternatively, the notches 60', 60" may be formed in the bushings 7 before the bushings are placed in the mould, whereby the bores 65 are only formed in the fibre-reinforced composite material and not in the material of the bushings 7.

Finally, a rod-shaped locking element 61 is fixedly arranged tightly fitting in each bore 65. Each bore 65 is arranged such that the axis thereof is substantially perpendicular to the longitudinal axis of the bushings 7 and so that the axis of the bore 65 extends substantially radial relative to the root region 26.

With respect to FIG. 5 it should be noted that it discloses the position of the bushings 7 in relation to the pre-made inserts 39 during manufacture of the wind turbine blade, why a bore passing through the notch 60' and the insert 39 is not shown. The through-going bore 65 is drilled after the manufacture of the wind turbine blade and the rod-shaped locking element 61 is subsequently arranged in the formed bore 65.

It should be noted that neither fibre-reinforced composite material nor bores 65 drilled therein are shown in FIGS. 6 and 7, as these figures serve to illustrate the bushings 7, the notches 60', 60" provided therein, and the rod-shaped locking elements 61 engaging the notch surfaces 67 of the notches 60', 60".

Further, as seen in FIGS. 3-4 the notches 60', 60" of all of the elongated fastening members 7 and consequently also the bores 65 may be arranged at the same distance from the root end face 29, i.e. that the notches of the bushings 7 are also placed at the same distance from the first end 9 of the bushings 7.

Advantageously, the bushings 7 and the rod-shaped locking elements 61 are made of a metal, such as iron or steel.

LIST OF REFERENCE NUMERALS

2 Wind turbine blade
3 Outer surface of root
4 Inner surface of root
5 Outer layer
6 Inner layer
7 Elongated fastening member (bushing)
9 First end of fastening member
10 Second end of fastening member
11 Outer periphery of fastening member
12 Central bore
13 Metal fibres
16 First layer comprising metal fibres
17 Wedge-shaped element
18 First end of element
19 Second end of element
22 Fastening means (inner threads)
23 Hub
24 Wind turbine
25 Nacelle
26 Root region
27 Airfoil region
28 Transition region
29 Root end face
31 Blade root
32 Blade tip
33 Trailing edge
34 Leading edge
35 Chord plane
36 Tower
37 Second layers
38 Second fibre material
39 Insert
40 First insert part
41 Second insert part
42 Lateral face of insert
43 Lateral face of insert
60' First notch
60" Second notch
61 Rod-shaped locking element
62 First end of rod-shaped locking element
63 Second end of rod-shaped locking element
65 Bore
66 Opening into bore
67 Notch surface
68 First end of notch surface
69 Second end of notch surface

The invention claimed is:

1. A wind turbine blade for a wind turbine rotor comprising a hub from which the wind turbine blade extends when mounted to the hub, the wind turbine blade including a shell structure of a fibre-reinforced composite material comprising fibres embedded in a polymer matrix, the wind turbine blade extending in longitudinal direction and having a profiled contour including a pressure side and a suction side as well as a leading edge and a trailing edge, said edges defining a chord plane therebetween, when seen in the longitudinal direction the profiled contour comprising a root region with a root end face, an airfoil region and optionally a transition region between the root region and the airfoil region, the root region having a ring-shaped cross section with an outer surface and an inner surface,
the root region comprising a plurality of elongated fastening members provided with fastening means, wherein the elongated fastening members are embedded mutually spaced apart in the fibre-reinforced polymer matrix so as to substantially follow a circumference of the root region and allow access from outside of the blade to the fastening means used for mounting the blade to the hub,
the fastening members comprising an outer surface, a first end arranged at the root end face and a second end opposite the first end thereof,
characterised in that at least a number of the elongated fastening members are provided with at least one notch in the periphery thereof, said notch having a notch wall, a first notch end and an opposite second notch end, and that a rod-shaped locking element passes through said notch so as to at least substantially engage at least a portion of the notch wall and so that a first portion of the rod-shaped locking element extends beyond the first notch end and a second portion of the rod-shaped locking element extends beyond the second notch end, the rod-shaped locking element being fixedly arranged in a circular bore having an axis and extending at least partly through the shell structure of the root region from the inner or outer surface of the shell structure.

2. A wind turbine blade according to claim 1, wherein the notch wall is partly cylindrical with a cylinder axis being coaxial with the axis of the bore.

3. A wind turbine blade according to claim 1, wherein the rod-shaped locking element has a circular cross section corresponding at least substantially to that of the bore.

4. A wind turbine blade according to claim 1, wherein the bore is a through-going bore.

5. A wind turbine blade according to claim 1, wherein the axis of the bore extends substantially in radial direction relative to the root region.

6. A wind turbine blade according to claim 1, wherein the notch is placed at distance from the first end of the elongated fastening members, said distance being 50-95% or 60-95% or 70-95% of the length of the elongated fastening members.

7. A wind turbine blade according to claim 1, wherein the fastening members are provided with two notches, a first notch and a second notch, said notches being arranged substantially opposite each other.

8. A wind turbine blade according to claim 1, wherein the notches of adjacent fastening members are arranged so as to face each other and the bore and the rod-shaped locking element are provided in such a way between the adjacent fastening members that the rod-shaped locking element engages the notch wall of both notches.

9. A wind turbine blade according to claim 1, wherein the notches of all of the fastening members are arranged at the same distance from the first end of the elongated fastening members.

10. A wind turbine blade according to claim 1, wherein the fastening members are bushings and the fastening means is a thread in a bore of the bushing.

11. A wind turbine blade according to claim 10, wherein the at least one notch is provided so as to intersect the bore of the bushing.

12. A wind turbine blade according to claim 1, wherein the fastening members and the rod-shaped locking elements are made of metal.

13. A wind turbine blade according to claim 1, wherein metal fibres are firmly fixed to the fastening members so as to extend therefrom and are embedded in the polymer matrix of the fibre-reinforced composite material of the root region.

14. Method of producing a wind turbine blade according to claim 1, wherein the elongated fastening members are provided with at least one notch before being embedded in the fibre-reinforced composite material of the root region, and wherein the bore is drilled through the composite material of the root region from the inner or outer surface of the shell structure such that it passes through the notch and at least substantially reveals the notch surface and subsequently thereto the rod-shaped locking element is fixedly arranged in the bore.

15. Method of producing a wind turbine blade according to claim 1, wherein the elongated fastening members are embedded in the fibre-reinforced composite material of the root region and wherein the bore is drilled through the composite material of the root region from the inner or outer surface of the shell structure such that it intersects the periphery of the elongated fastening member and thereby provides the notch surface, and subsequently thereto the rod-shaped locking element is fixedly arranged in the bore.

* * * * *

UNITED STATES PATENT AND TRADEMARK OFFICE
CERTIFICATE OF CORRECTION

PATENT NO. : 9,551,317 B2  
APPLICATION NO. : 14/110897  
DATED : January 24, 2017  
INVENTOR(S) : Martin Dahl It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 550 days.

Signed and Sealed this

Twenty-fifth Day of September, 2018

Andrei Iancu  
*Director of the United States Patent and Trademark Office*